(12) United States Patent
Chou et al.

(10) Patent No.: US 10,129,784 B2
(45) Date of Patent: Nov. 13, 2018

(54) MME OVERLOAD OR UNDERLOAD MITIGATION BY MME VNF APPARATUS AND METHOD

(71) Applicant: Intel IP Corporation, Santa Clara, CA (US)

(72) Inventors: Joey Chou, Scottsdale, AZ (US); Meghashree Dattatri Kedalagudde, Portland, OR (US); Muthaiah Venkatachalam, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/676,790

(22) Filed: Aug. 14, 2017

(65) Prior Publication Data

US 2018/0063741 A1 Mar. 1, 2018

Related U.S. Application Data

(63) Continuation of application No. 14/881,019, filed on Oct. 12, 2015, now Pat. No. 9,769,694.

(Continued)

(51) Int. Cl.
*H04W 24/00* (2009.01)
*H04W 28/02* (2009.01)
(Continued)

(52) U.S. Cl.
CPC ... *H04W 28/0226* (2013.01); *H04W 28/0236* (2013.01); *H04W 28/08* (2013.01); *H04W 28/16* (2013.01); *H04W 88/005* (2013.01)

(58) Field of Classification Search
CPC ......... H04W 28/0226; H04W 28/0236; H04W 28/16; H04W 28/08; H04W 88/005
(Continued)

(56) References Cited

U.S. PATENT DOCUMENTS

| 2010/0124933 A1* | 5/2010 | Chowdhury | ........ H04L 41/0896 |
| | | | 455/453 |
| 2012/0039299 A1* | 2/2012 | Teyeb | .................. H04B 7/2606 |
| | | | 370/331 |

(Continued)

FOREIGN PATENT DOCUMENTS

| CN | 104115447 A | 10/2014 |
| CN | 104137482 A | 11/2014 |

(Continued)

OTHER PUBLICATIONS

ETSI, "Network Functions Virtualisation (NFV); Management and Orchestration," ETSI GS NFV-MAN 001 V1.1.1 (Dec. 2014), Dec. 24, 2014, 184 pages.

(Continued)

Primary Examiner — Marcos Batista
(74) Attorney, Agent, or Firm — Schwabe, Williamson & Wyatt, P.C.

(57) ABSTRACT

Embodiments of the present disclosure describe apparatuses and methods for mobility management entity (MME) overload or underload mitigation using an MME virtual network function (VNF). Various embodiments may include one or more processors to execute instructions to process a notification from a virtual network function manager (VNFM) to determine instantiation of a MME as a VNF, add the MME to an MME pool, and assign a value to an application parameter of the MME VNF. Other embodiments may be described and/or claimed.

17 Claims, 6 Drawing Sheets

Related U.S. Application Data (60) Provisional application No. 62/133,023, filed on Mar. 13, 2015.

(51) Int. Cl.
*H04W 28/08* (2009.01)
*H04W 28/16* (2009.01)
*H04W 88/00* (2009.01)

(58) Field of Classification Search
USPC .............................. 455/456.1–456.3; 370/338
See application file for complete search history.

(56) References Cited

U.S. PATENT DOCUMENTS

| | | | | |
|---|---|---|---|---|
| 2014/0233386 | A1* | 8/2014 | Jamadagni | H04W 36/22 370/235 |
| 2014/0317261 | A1* | 10/2014 | Shatzkamer | G06F 9/455 709/223 |

FOREIGN PATENT DOCUMENTS

| | | |
|---|---|---|
| TW | 201507387 A | 2/2015 |
| WO | 2016/022698 A1 | 2/2016 |
| WO | 2016/048430 A1 | 3/2016 |

OTHER PUBLICATIONS

3GPP, "Technical Specification Group Services and System Aspects; Telecommunication management; Performance Management (PM); Performance measurements Evolved Packet Core (EPC) network (Release 12)," 3GPP TS 32.426 V12.0.0 (Oct. 2014), Oct. 2, 2014, Lte Advanced, 84 pages.

3GPP, "Technical Specification Group Radio Access Network; Evolved Universal Terrestrial Radio Access Network (E-UTRAN); S1 Application Protocol (S1AP) (Release 12)," 3GPP TS 36.413 V12.4.0 (Dec. 2014), Dec. 26, 2014, Lte Advanced, 300 pages.

3GPP, "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.1.0 (Dec. 2014), Dec. 17, 2014, Lte Advanced, 310 pages.

International Search Report and Written Opinion dated Apr. 26, 2016 from International Application No. PCT/US2016/016426, 15 pages.

Intel, "pCR MME overload mitigation by MME VNF procedure," 3GPP TSG SA WG5 (Telecom Management) Meeting #98bis, S5-152015, Agenda Item: 6.6.3, Jan. 27-29, 2015, Beijing, China, 3 pages.

Intel, "pCR MME VNF instance scale in and out," 3GPP TSG SA WG5 (Telecom Management) Meeting #96, S5-144251, Agenda Item: 6.9.4, Aug. 18-22, 2014, Sophia Antipolis, France, 4 pages.

Intel, "pCR MME VNF Instantiationand termination for mixed network," 3GPP TSG SA WG5 (Telecom Management) Meeting #96, S5-144250, Agenda Item: 6.9.4, Aug. 18-22, 2014, Sophia Antipolis, France, 5 pages.

Office Action dated May 24, 2017 from Taiwan Patent Application No. 105103610, 14 pages.

SWG-OAM Chairman, "SWG-OAM Executive Report," 3GPP TSG-SA5 (Telecom Management) #100, S5-152005, Revision of S5-15xxxx, Agenda Item: 6.1, Apr. 13-17, 2015, Dubrovnik (Croatia), 14 pages.

Taiwan Patent Office—Office Action dated Aug. 29, 2018 from Taiwan Divisional Application No. 106145363, 11 pages.

\* cited by examiner

MME OVERLOAD OR UNDERLOAD MITIGATION BY MME VNF APPARATUS AND METHOD

CROSS REFERENCE TO RELATED APPLICATIONS

The present application is a continuation of U.S. patent application Ser. No. 14/881,019, filed Oct. 12, 2015, entitled "MME OVERLOAD OR UNDERLOAD MITIGATION BY MME VNF APPARATUS AND METHOD," which claims priority to U.S. Provisional Patent Application No. 62/133,023, filed Mar. 13, 2015, entitled "METHOD AND APPARATUS OF MME OVERLOAD OR UNDERLOAD MITIGATION BY MME VNF IN THE LTE NETWORKS", the entire disclosures of which are hereby incorporated by reference in their entireties for all purposes, except for those sections, if any, that are inconsistent with this specification.

FIELD

Embodiments of the present disclosure generally relate to the field of wireless communication, and more particularly, to apparatuses and methods for enabling Mobility Management Entity (MME) functionality.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

MME load balancing and rebalancing functions help direct a User Equipment (UE) in an MME pool area to an appropriate MME in a manner such that the UE to MME connections are evenly distributed among MMEs in the MME pool. In existing network configurations, the MMEs are physical network functions (PNFs) such that the number of MMEs in the MME pool is static and an MME can be overloaded as the number of UEs entering the network keeps rising. Existing MME overload control uses Non-Access Stratum (NAS) signaling to reject NAS requests from UEs, which can cause service degradation to subscribers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
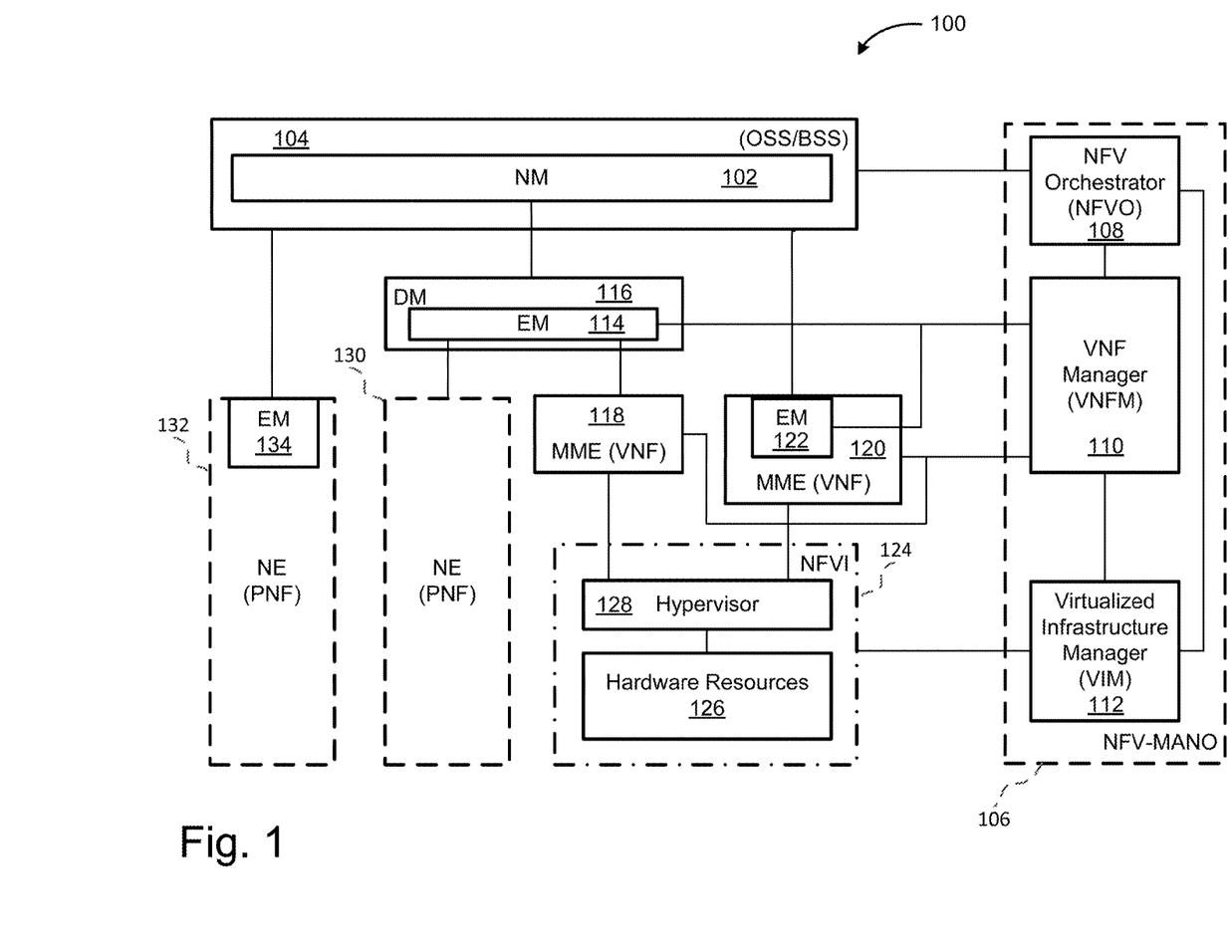
FIG. 1 schematically illustrates a hybrid management system for managing both non-virtualized and virtualized networks in accordance with various embodiments.

FIG. 1 schematically illustrates a hybrid management system 100 for managing both non-virtualized and virtualized networks in accordance with various embodiments. In some embodiments, the hybrid management system 100 may include a network manager (NM) 102 that may be included in an operations support system/business support system (OSS/BSS) 104. The OSS/BSS 104 may be in data communication with a network function virtualization (NFV) management and orchestration (MANO) system (NFV-MANO) 106 in various embodiments. The NFV-MANO 106 may include an NFV orchestrator (NFVO) 108, a virtual network function (VNF) manager (VNFM) 110, and a virtualized infrastructure manager (VIM) 112 that may be coupled with and in data communication with each other in various embodiments. The VNFM 110 may be coupled with and in data communication with an element manager (EM) 114 that may be included in a domain manager (DM) 116. The VNFM 110 may instantiate and/or configure a first MME VNF 118 and/or a second MME VNF 120 in various embodiments. In some embodiments, an MME VNF may include an EM such as EM 122 shown in MME VNF 120. The EM 122 may also be coupled with and in data communication with the VNFM 110.

In various embodiments, the hybrid management system 100 may include a network function virtualization infrastructure (NFVI) 124 that may include hardware resources 126 and a hypervisor 128. The hardware resources 126 may include various computing resources such as one or more processors, volatile and/or non-volatile memory, storage, networking, and input/output (10) resources in various embodiments. In some embodiments, a virtualization layer in addition to or other than a hypervisor may be used. The EM 114 may be coupled with a network element (NE) physical network function (PNF) 130 such as an MME PNF in various embodiments. An NE PNF 132 may include an EM 134 that may be coupled with the OSS/BSS 104 in some embodiments.

Figure 2:
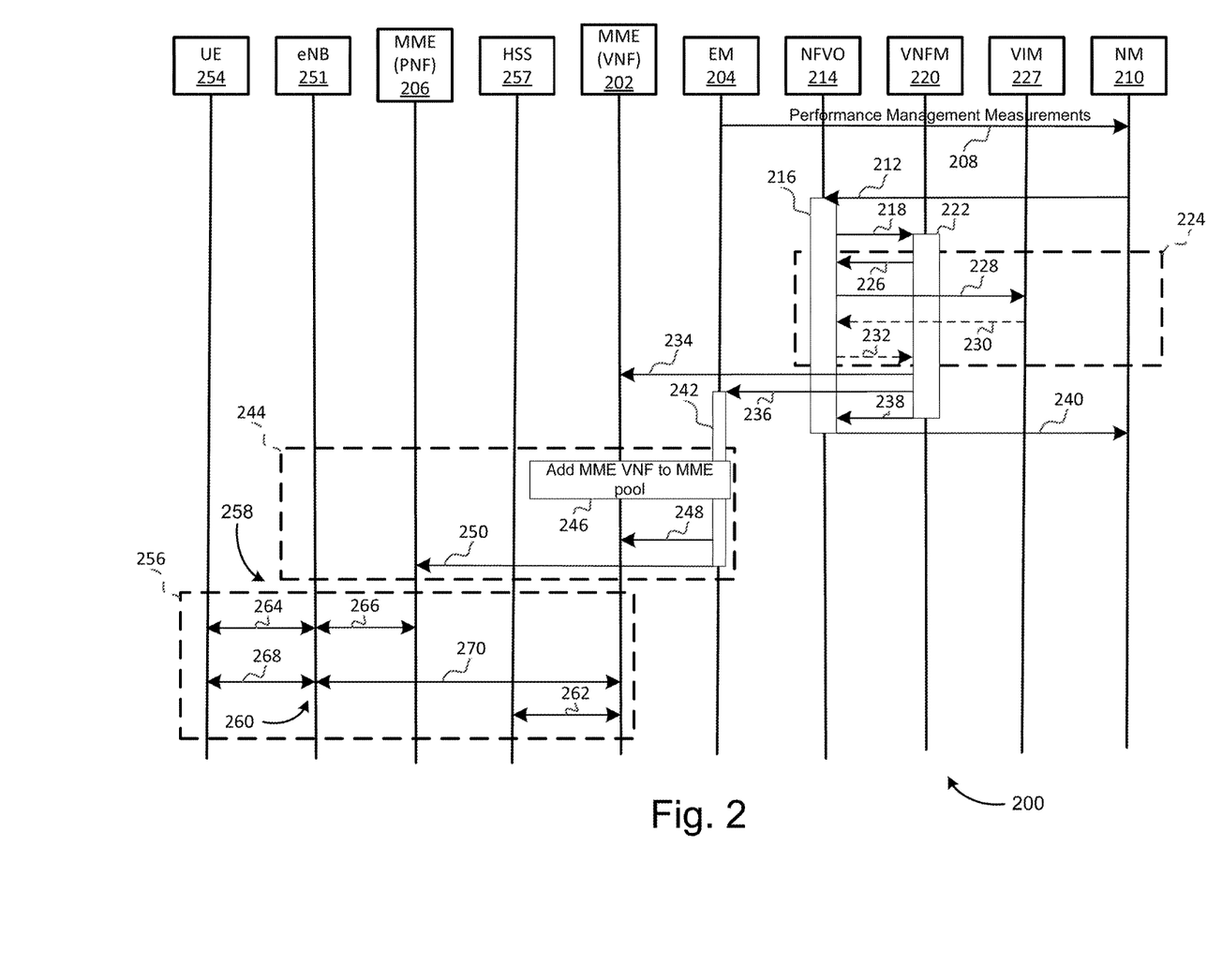
FIG. 2 is a diagram illustrating an MME overload mitigation process using an MME virtual network function (VNF) in accordance with various embodiments.

FIG. 2 is a diagram illustrating an MME overload mitigation process 200 using an MME VNF 202 in accordance with various embodiments. The MME VNF 202 may be substantially similar to the MME VNF 118 or the MME VNF 120 described with respect to FIG. 1 in various embodiments. An EM 204 may send performance management (PM) measurements relating to an MME PNF 206 in a PM communication 208 to an NM 210 that receives the PM measurements. In various embodiments, the PM measurements may include MME processor usage, S1-MME data volume, or other PM measurements.

The NM 210 may determine that the MME PNF 206 is overloaded based at least in part on the received PM measurements. The NM 210 may send an MME VNF instantiation request 212 to an NFVO 214 to instantiate a new MME VNF such as the MME VNF 202. The NFVO 214 may perform an MME VNF instantiation process at a block 216. The NFVO 214 may send an MME VNF instantiation request 218 to a VNFM 220. The VNFM 220 may instantiate the MME VNF 202 at a block 222 in response to the instantiation request 218.

At a block 224, the MME VNF instantiation request 218 may be validated and processed. In various embodiments, validation and processing at the block 224 may include request validation and processing by the VNFM 220. The VNFM 220 may send a resource allocation request 226 to the NFVO 214 to request a virtual information manager (VIM) 227 to allocate resources required by an MME VNF instance. In various embodiments, the NFVO 214 may perform pre-allocation processing and send a resource allocation request 228 to the VIM 227. In some embodiments, the resource allocation request 228 may include compute, storage, network, and/or interconnection allocation and/or setup parameters. In various embodiments, the VIM 227 may allocate an internal connectivity network, allocate compute and storage resources of a virtual machine (VM), and attach the VM to the internal connectivity network. The VIM 227 may send an acknowledgement (Ack) 230 to the NFVO 214 indicating that resource allocation is completed, and the NFVO 214 may send an Ack 232 to the VNFM 220 indicating that resource allocation is completed.

After the VIM 227 has allocated resources, the VNFM 220 may perform a configuration 234 of the MME VNF 202 with lifecycle parameters. The VNFM 220 may send a notification 236 to the EM 204, notifying the EM 204 of the new MME VNF 202. The VNFM 220 may send an acknowledgement 238 back to the NFVO 214, acknowledging completion of MME VNF instantiation. The NFVO 214 may send an acknowledgement 240 to the NM 210, acknowledging the completion of MME VNF instantiation to the NM 210. The EM 204 may receive the notification 236 of the new MME VNF 202 at a block 242. At a block 244, the EM 204 may configure the MME VNF 202 with application specific parameters. In some embodiments, the parameters may include application parameters such as a weight factor parameter and the EM 204 may assign values to the application parameters such as a weight factor for the weight factor parameter. The application parameters may be referred to as information elements (IEs) in some embodiments and the weight factor parameter may be referred to as a relative MME capacity IE in various embodiments. In some embodiments, the weight factor may be an integer that is greater than or equal to zero and less than or equal to 255. Alternatively, the weight factor may be a different numerical type and/or in a different range in some embodiments. In some embodiments, the weight factors allow an evolved node B (eNB) to select an MME to service a UE in a manner proportional to the relative weight factors assigned to the MMEs in an MME pool.

At a block 246, the EM 204 may add the MME VNF 202 to a MME pool that may include the MME PNF 206. The EM 204 may send a weight factor configuration 248 to the MME VNF 202. The EM 204 may send a weight factor configuration 250 to the MME PNF 206 to assign a weight factor to the MME PNF 206. In various embodiments, the EM 204 may set the weight factor configuration 248 to be higher relative to the weight factor configuration 250 which may be configured with a relatively low weight factor to enable UEs such as a UE 254 to choose to connect with the MME VNF 202 rather than the MME PNF 206 when the UEs are to re-attach to the network. In embodiments, the weight factor configuration 248 may include a first weight factor and the weight factor configuration 250 may include a second weight factor. The weight factor assigned to the MME VNF 202 may be associated with selection of the MME VNF 202 from a plurality of MMEs of the MME pool to service a UE connection in some embodiments in that the weight factors assigned to the MMEs, including the MME VNF 202, may allow an eNB to select an MME to service a UE in a manner proportional to the relative weight factors assigned to the MMEs in the MME pool as mentioned above.

At a block 256, the MME VNF 202, the MME PNF 206, an eNB 251, the UE 254, and a home subscriber server (HSS) 257 may run an S1 release procedure 258, a TAU procedure 260, and a location update procedure 262 to offload UEs such as the UE 254 to the MME VNF 202. The S1 release procedure 258 may include a first release communication 264 between the UE 254 and the eNB 251 and a second release communication 266 between the eNB and the MME PNF 206 to release the S1 connection. The TAU procedure 260 may include a first TAU communication 268 between the UE 254 and the eNB 251 and a second TAU communication 270 between the eNB 251 and the MME VNF 202 that enables UE 254 to select MME VNF 202. In various embodiments, the location update procedure 262 may include an update location request sent from the MME VNF 202 to the HSS 257 that may include information such as MME Identity, international mobile subscriber identity (IMSI), update location request flags (ULR-Flags), MME Capabilities, Homogenous Support of IP Multimedia Subsystem (IMS) Voice over packet switched (PS) Sessions, UE single radio voice call continuity (SRVCC) capability, equivalent public land mobile network (PLMN) list, and/or mobile equipment (ME) Identity (IMEI software version (IMEISV)) in some embodiments.

In various embodiments, components described with respect to FIG. 2 may correspond to similar components described with respect to FIG. 1. The MME VNF 202 may be substantially similar to the MME VNF 118 or the MME VNF 120 of FIG. 1. The MME PNF 206 of FIG. 2 may correspond to the NE PNF 130 or NE PNF 132 of FIG. 1. The EM 204 may correspond to the EM 114 or a combination of EM 122 and 134 in various embodiments. The NM 210, NFVO 214, VNFM 220, and VIM 227 of FIG. 2 may correspond to the NM 102, NFVO 108, VNFM 110, and VIM 112 of FIG. 1, respectively.

Figure 3:
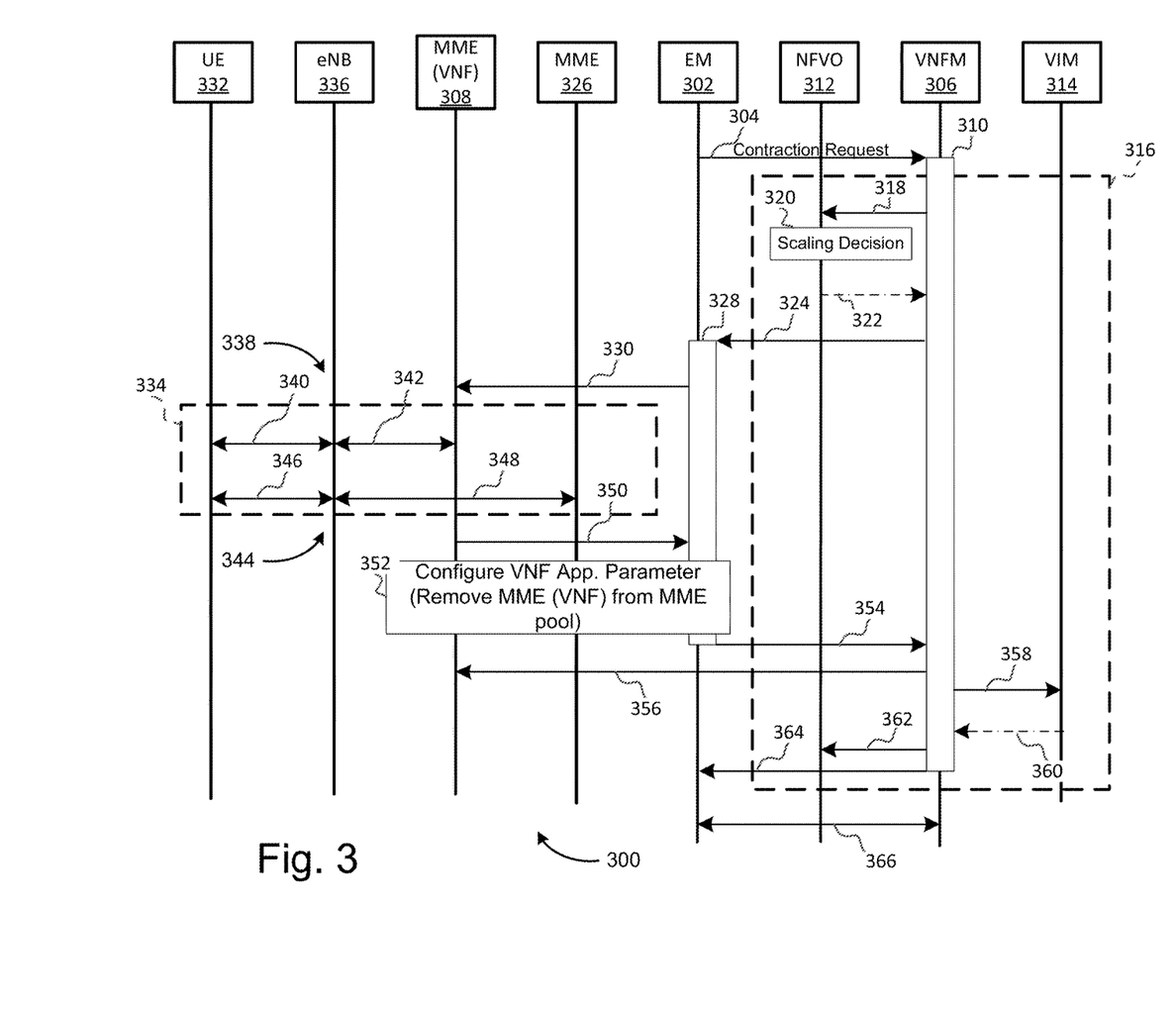
FIG. 3 is a diagram illustrating an MME VNF contraction process in accordance with various embodiments.

FIG. 3 is a diagram illustrating an MME VNF contraction process 300 in accordance with various embodiments. An EM 302 may send a contraction request 304 to a VNFM 306 to release capacity for a MME VNF 308. At a block 310, the VNFM 306 may perform an MME VNF contraction process along with an NFVO 312 and a VIM 314 at a block 316. In various embodiments, the VNFM 306 may send a validation request 318 to the NFVO 312 requesting validation for the MME VNF contraction and scale in of the MME VNF using a grant lifecycle operation of a VNF lifecycle operation granting interface. In some embodiments, the validation request 318 may be based at least in part on a VNF descriptor (VNFD) associated with the MME VNF 308. The NFVO 312 may take a scaling decision at a block 320 and send an Ack 322 to the VNFM 306 granting MME VNF contraction.

The VNFM 306 may send an offload request 324 to the EM 302 requesting the EM 302 to offload UEs from the MME VNF 308 to a neighboring MME 326. At a block 328, the EM 302 may offload the UEs. The EM 302 may send a configuration command 330 to the MME VNF 308 configuring MME VNF parameters. In various embodiments, the configuration command 330 may include assigning a low weight factor that may correspond to a relative MME capacity to the MME VNF 308. In embodiments, the low weight factor may enable UEs such as a UE 332 to choose neighboring MME 326 when the UEs are to re-attach to the network. At a block 334, UEs such as the UE 332 may be offloaded from the MME VNF 308 to the MME 326. The UEs associated with the MME VNF 308, such as the UE 332, and an eNB 336 may run an S1 release procedure 338 that may include a first S1 release communication 340 between the UE 332 and the eNB 336 and a second S1 release communication 342 between the eNB 336 and the MME VNF 308 to release the S1 connection. In various embodiments, a TAU procedure 344 may be performed by the UEs such as the UE 332 and the eNB 336 to offload the UEs to a neighboring MME such as the MME 326. The TAU procedure 344 may include a first TAU communication 346 between the UE 332 and the eNB 336 and a second TAU communication 348 between the eNB 336 and the MME 326 to enable UE 332 to select MME 326. When all UEs are offloaded to the MME 326, the MME VNF 308 may send a notification 350 to the EM 302.

At a block 352, the EM 302 may configure VNF application specific parameters by removing the MME VNF 308 from the MME pool. The EM 302 may send a notification 354 to the VNFM 306 that no UE is connected to the MME VNF 308. The VNFM 306 may perform a termination process 356 to terminate the MME VNF 308 in response to receiving the notification 354. The VNFM 306 may send a resource release request 358 to the VIM 314. The VIM 314 may release the resources associated with the MME VNF 308 and send an Ack 360 to the VNFM 306. The VNFM 306 may send a successful contraction notification 362 to the NFVO 312 in response to the Ack 360 from the VIM 314. The VNFM 306 may send an Ack 364 to the EM 302 that an existing VNF has been updated as requested with a capacity release. In various embodiments, the EM 302 and the VNFM 306 may perform an update 366 of the VNF managed device. In some embodiments, the MIME VNF 308 may be removed from the MME pool in response to a notification that all UEs are offloaded from the MME VNF 308, or in response to a notification that the MME VNF 308 is no longer providing services to UEs.

In various embodiments, components described with respect to FIG. 3 may correspond to similar components described with respect to FIG. 1. The MME VNF 308 may be substantially similar to the MME VNF 118 or the MME VNF 120 of FIG. 1. The MME 326 of FIG. 3 may correspond to the NE PNF 130 or NE PNF 132 of FIG. 1. The EM 302 may correspond to the EM 114 or a combination of EM 122 and 134 in various embodiments. The NFVO 312, VNFM 306, and VIM 314 of FIG. 3 may correspond to the NFVO 108, VNFM 110, and VIM 112 of FIG. 1, respectively.

Figure 4:
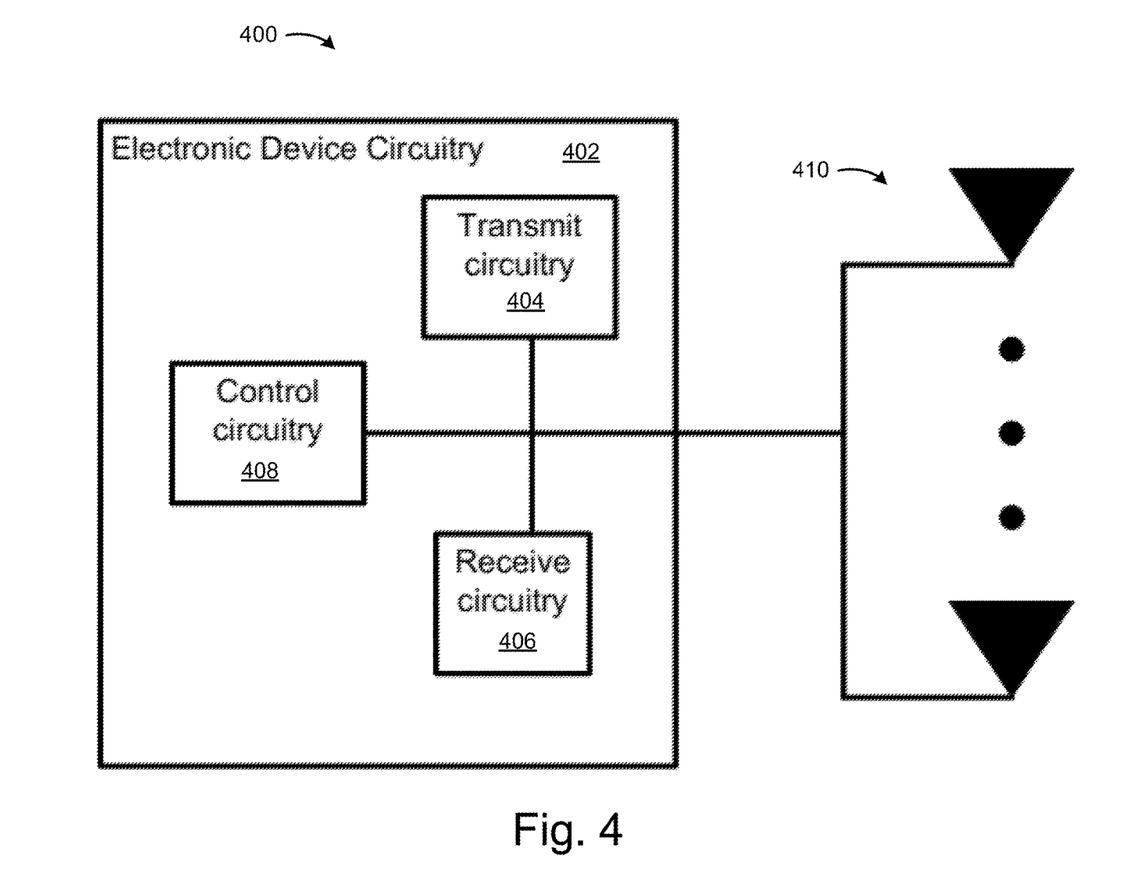
FIG. 4 is a block diagram of a device with electronic device circuitry in accordance with various embodiments.

FIG. 4 illustrates a device 400 with electronic device circuitry 402 that may be eNB circuitry, UE circuitry, MME (VNF) circuitry, MME (PNF) circuitry, MME circuitry, EM circuitry, NFVO circuitry, VNFM circuitry, VIM circuitry, or some other type of circuitry in accordance with various embodiments. In embodiments, all or a part of the electronic device circuitry 402 may be, or may be incorporated into or otherwise a part of, a eNB such as the eNB 251 or the eNB 336, a UE such as the UE 254 or the UE 332, a MME (VNF) such as the MME VNF 202 or the MME VNF 308, a MME (PNF) such as the MME PNF 206, a MME such as the MME 326, a EM such as the EM 204 or the EM 302, a NFVO such as the NFVO 214 or the NFVO 312, a VNFM such as the VNFM 220 or the VNFM 306, a VIM such as the VIM 227 or the VIM 314, or some other type of electronic device. In embodiments, the electronic device circuitry may include radio transmit circuitry 404 and receive circuitry 406 coupled to control circuitry 408. In embodiments, the transmit circuitry 404 and/or receive circuitry 406 may be elements or modules of transceiver circuitry, as shown. The electronic device circuitry 402 may be coupled with one or more plurality of antenna elements 410 of one or more antennas. The electronic device circuitry 402 and/or the components of the electronic device circuitry 402 may be configured to perform operations similar to those described elsewhere in this disclosure. In some embodiments, the electronic device circuitry 402 may be implemented in, or functions associated with the circuitry may be implemented by, one or more software or firmware modules.

Figure 5:
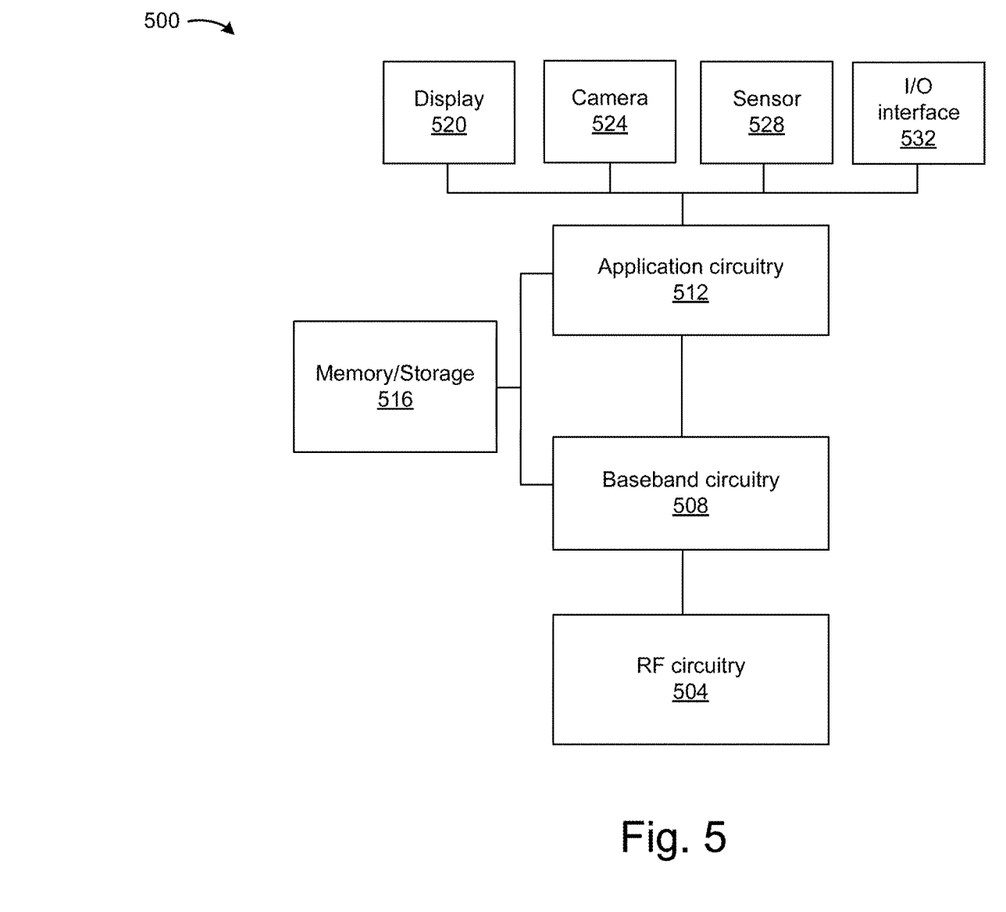
FIG. 5 is a block diagram of an example computing device that may be used to practice various embodiments described herein.

The NM 102, OSS/BSS 104, NFV-MANO 106, NFVO 108, VNFM 110, VIM 112, EM 114, DM 116, MME VNF 118, MME VNF 120, EM 122, NFVI 124, hardware resources 126, hypervisor 128, PNF 130, NE PNF 132, EM 134, MME VNF 202, EM 204, MME PNF 206, NM 210, NFVO 214, VNFM 220, VIM 227, eNB 251, UE 254, HSS 257, EM 302, VNFM 306, MME VNF 308, NFVO 312, VIM 314, MME 326, UE 332, eNB 336, electronic device circuitry 402, transmit circuitry 404, receive circuitry 406, or control circuitry 408, as described in connection with FIGS. 1-4, may be implemented into a system using any suitable hardware, firmware, and/or software configured as desired. FIG. 5 illustrates, for one embodiment, an example system 500 including communication circuitry such as radio frequency (RF) circuitry 504 and baseband circuitry 508, application circuitry 512, memory/storage 516, display 520, camera 524, sensor 528, and input/output (I/O) interface 532, coupled with each other at least as shown. In various embodiments, some or all of the elements described with respect to the system 500 may be used to implement one or more of the elements described with respect to FIGS. 1-4. In some embodiments, the communication circuitry may include circuitry in addition to or other than RF circuitry 504 and/or baseband circuitry 508. In various embodiments, some or all aspects described with respect to RF circuitry 504 and/or baseband circuitry 508 may be performed by other types of communication circuitry.

The application circuitry 512 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 516 and configured to execute instructions stored in the memory/storage 516 to enable various applications and/or operating systems running on the system 500.

The baseband circuitry 508 may include circuitry such as, but not limited to, one or more single-core or multi-core processors. The processor(s) may include a baseband processor. The baseband circuitry 508 may include one or more digital signal processors (DSPs) in various embodiments. The baseband circuitry 508 may handle various radio control functions that enable communication with one or more radio networks via the RF circuitry 504. The radio control functions may include, but not limited to, signal modulation, encoding, decoding, radio frequency shifting, etc. In some embodiments, the baseband circuitry 508 may provide for communication compatible with one or more radio technologies. For example, in some embodiments, the baseband circuitry 508 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 508 is configured to support radio communications of more than one wireless protocol may be referred to as multi-mode baseband circuitry.

In various embodiments, baseband circuitry 508 may include circuitry to operate with signals that are not strictly considered as being in a baseband frequency. For example, in some embodiments, baseband circuitry 508 may include circuitry to operate with signals having an intermediate frequency, which is between a baseband frequency and a radio frequency.

RF circuitry 504 may enable communication with wireless networks using modulated electromagnetic radiation through a non-solid medium. In various embodiments, the RF circuitry 504 may include switches, filters, amplifiers, etc., to facilitate the communication with the wireless network.

In various embodiments, RF circuitry 504 may include circuitry to operate with signals that are not strictly considered as being in a radio frequency. For example, in some embodiments, RF circuitry 504 may include circuitry to operate with signals having an intermediate frequency, which is between a baseband frequency and a radio frequency.

In various embodiments, transmit circuitry, control circuitry, and/or receive circuitry discussed or described herein, such as the transmit circuitry 404, the receive circuitry 406, or the control circuitry 408 of FIG. 4, may be embodied in whole or in part in one or more of the RF circuitry 504, the baseband circuitry 508, and/or the application circuitry 512.

In some embodiments, some or all of the constituent components of the baseband circuitry 508, the application circuitry 512, and/or the memory/storage 516 may be implemented together on a system on a chip (SOC).

Memory/storage 516 may be used to load and store data and/or instructions, for example, for system 500. Memory/storage 516 for one embodiment may include any combination of suitable volatile memory (e.g., dynamic random access memory (DRAM)) and/or non-volatile memory (e.g., Flash memory).

In various embodiments, the I/O interface 532 may include one or more user interfaces to enable user interaction with the system 500 and/or peripheral component interfaces to enable peripheral component interaction with the system 500. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 528 may include one or more sensing devices to determine environmental conditions and/or location information related to the system 500. In some embodiments, the sensors may include, but are not limited to, a gyro sensor, an accelerometer, a proximity sensor, an ambient light sensor, and a positioning unit. The positioning unit may also be part of, or interact with, the baseband circuitry 508 and/or RF circuitry 504 to communicate with components of a positioning network, e.g., a global positioning system (GPS) satellite.

In various embodiments, the display 520 may include a display, e.g., a liquid crystal display, a touch screen display, etc. In various embodiments, the system 500 may be a mobile computing device such as, but not limited to, a laptop computing device, a tablet computing device, a netbook, an ultrabook, a smartphone, etc. In various embodiments, system 500 may have more or fewer components, and/or different architectures.

Embodiments of the technology herein may be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

Figure 6:
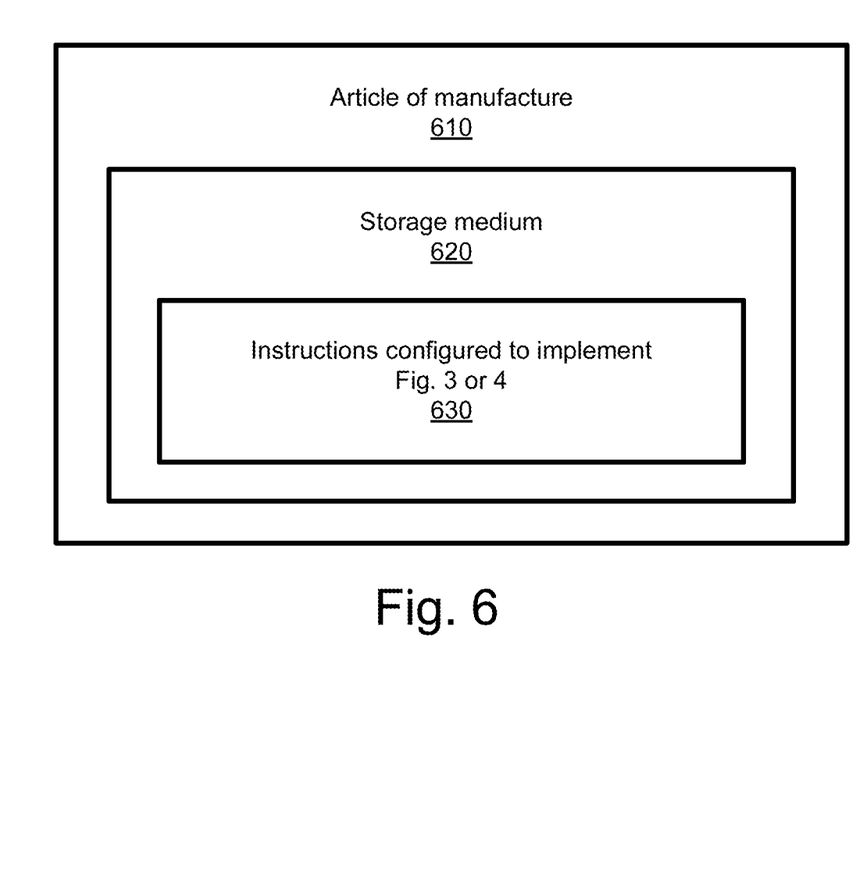
FIG. 6 illustrates an article of manufacture having programming instructions, incorporating aspects of the present disclosure, in accordance with various embodiments.

FIG. 6 illustrates an article of manufacture 610 having programming instructions, incorporating aspects of the present disclosure, in accordance with various embodiments. In various embodiments, an article of manufacture may be employed to implement various embodiments of the present disclosure. As shown, the article of manufacture 610 may include a computer-readable non-transitory storage medium 620 where instructions 630 may be configured to practice embodiments of or aspects of embodiments of any one of the processes described herein. The storage medium 620 may represent a broad range of persistent storage media known in the art, including but not limited to flash memory, dynamic random access memory, static random access memory, an optical disk, a magnetic disk, etc. In embodiments, computer-readable storage medium 620 may include one or more computer-readable non-transitory storage media. In other embodiments, computer-readable storage medium 620 may be transitory, such as signals, encoded with instructions 630.

In various embodiments, instructions 630 may enable an apparatus, in response to its execution by the apparatus, to perform various operations described herein. As an example, storage medium 620 may include instructions 630 configured to cause an apparatus or module, e.g., NM 102, OSS/BSS 104, NFV-MANO 106, NFVO 108, VNFM 110, VIM 112, EM 114, DM 116, MME VNF 118, MME VNF 120, EM 122, NFVI 124, hardware resources 126, hypervisor 128, PNF 130, NE PNF 132, EM 134, MME VNF 202, EM 204, MME PNF 206, NM 210, NFVO 214, VNFM 220, VIM 227, eNB 251, UE 254, HSS 257, EM 302, VNFM 306, MME VNF 308, NFVO 312, VIM 314, MME 326, UE 332, eNB 336, electronic device circuitry 402, transmit circuitry 404, receive circuitry 406, control circuitry 408, system 500, RF circuitry 504, baseband circuitry 508, or application circuitry 512 as described in connection with FIGS. 1-5, to practice some aspects of MME overload or underload mitigation using an MME VNF, e.g., as illustrated in MME overload mitigation process 200 of FIG. 2 or MME VNF contraction process 300 of FIG. 3, in accordance with embodiments of the present disclosure.

The following paragraphs describe examples of various embodiments.

Example 1 may include an element manager (EM) comprising: one or more storage media having instructions; and one or more processors, coupled with the one or more storage media to execute the instructions to: process a notification from a virtual network function manager (VNFM) to determine instantiation of a mobility management entity (MME) as a virtual network function (VNF); add the MME VNF to an MME pool; and assign a value to an application parameter of the MME VNF.

Example 2 may include the subject matter of Example 1, wherein the application parameter is a weight factor parameter and the value is a weight factor, wherein the weight factor is associated with selection of the MME VNF from a plurality of MMEs of the MME pool to service a user equipment (UE) connection.

Example 3 may include the subject matter of any one of Examples 1-2, wherein the one or more processors are further to execute the instructions to add the MME VNF to the MME pool in response to a notification that the MME VNF has been instantiated.

Example 4 may include the subject matter of Example 3, wherein the one or more processors are further to execute the instructions to: determine a performance management (PM) measurement of a MME physical network function (PNF); send the PM measurement to a network manager; and receive the notification that the MME VNF has been instantiated in response to the send of the PM measurement.

Example 5 may include the subject matter of Example 4, wherein the PM measurement includes an MME processor usage measurement.

Example 6 may include the subject matter of Example 4, wherein the PM measurement includes an S1-MME data volume measurement.

Example 7 may include the subject matter of any one of Examples 2-6, wherein the weight factor is a first weight factor and the one or more processors are further to execute the instructions to assign a second weight factor to an MME physical network function (PNF), wherein the second weight factor is lower than the first weight factor.

Example 8 may include the subject matter of Example 7, wherein the one or more processors are further to execute the instructions to assign an updated first weight factor to the MME VNF in response to a request to offload user equipments (UEs) from the MME VNF, wherein the updated first weight factor is lower than the first weight factor.

Example 9 may include the subject matter of any of Examples 7-8, wherein the one or more processors are further to execute the instructions to remove the MME VNF from the MME pool in response to a notification that all UEs are offloaded from the MME VNF, or the MME VNF is no longer providing services to UEs.

Example 10 may include the subject matter of Example 9, wherein the one or more processors are further to execute the instructions to send a notification to a virtual network function manager (VNFM) that no UE is connected to the MME VNF.

Example 11 may include the subject matter of any one of Examples 2-6, wherein the weight factor is a first weight factor and the processing circuitry is also to assign a second weight factor to a second MME VNF in the MME pool, wherein the first weight factor is higher than the second weight factor.

Example 12 may include the subject matter of any one of Examples 2-11, wherein the MME pool is in a long term evolution (LTE) environment.

Example 13 may include a network function virtualization orchestrator (NFVO) comprising: one or more storage media having instructions; and one or more processors, coupled with the one or more storage media to execute the instructions to: process a virtual network function (VNF) instantiation request from a network manager (NM); and direct a virtual network function manager (VNFM) to instantiate a mobility management entity (MME) VNF in response to the VNF instantiation request.

Example 14 may include the subject matter of Example 13 wherein the one or more processors are further to execute the instructions to send a resource allocation request to a virtualized infrastructure manager (VIM).

Example 15 may include the subject matter of Example 14, wherein the resource allocation request includes at least one of a compute allocation parameter or a storage allocation parameter.

Example 16 may include the subject matter of any one of Examples 13-15, wherein the one or more processors are further to execute the instructions to send an acknowledgement to the NM indicating MME VNF instantiation is completed.

Example 17 may include a virtual network function manager (VNFM) comprising: one or more storage media having instructions; and one or more processors, coupled with the one or more storage media to execute the instructions to: process an instantiation request for a mobility management entity (MME) virtual network function (VNF) from a network function virtualization orchestrator (NFVO); send a resource allocation request to the NFVO in response to the instantiation request; and configure a MME VNF.

Example 18 may include the subject matter of Example 17, wherein the one or more processors are further to execute the instructions to send a notification to an element manager (EM) notifying the EM of the MME VNF.

Example 19 may include the subject matter of any one of Examples 17-18, wherein the one or more processors are further to execute the instructions to send an acknowledgement to the NFVO indicating completion of MME VNF instantiation.

Example 20 may include the subject matter of any one of Examples 17-19, wherein the one or more processors are further to execute the instructions to process a request from an EM to release capacity for the MME VNF and send an offload request to the EM requesting the EM to offload user equipments (UEs) from the MME VNF.

Example 21 may include the subject matter of Example 20, wherein the one or more processors are further to execute the instructions to perform a termination process to terminate the MME VNF in response to a notification from the EM that no UE is connected to the MME VNF.

Example 22 may include the subject matter of Example 21, wherein the one or more processors are further to execute the instructions to send an acknowledgement to the EM that an existing VNF has been updated as requested with a capacity release.

Example 23 may include a network manager (NM) comprising: one or more storage media having instructions; and one or more processors, coupled with the one or more storage media to execute the instructions to: process performance management (PM) measurements for a mobility management entity (MME) from an element manager (EM); determine that the MME is overloaded in response to a PM measurement above a predefined threshold level; and send a MME virtual network function (VNF) instantiation request to a network function virtualization orchestrator (NFVO).

Example 24 may include the subject matter of Example 23, wherein the one or more processors are to determine that the MME is overloaded in response to MME processor usage above a predefined threshold level.

Example 25 may include the subject matter of Example 23, wherein the one or more processors are to determine that the MME is overloaded in response to S1-MME data volume above a predefined threshold level.

Example 26 may include a method of controlling mobility management entity (MME) load status comprising: processing a notification from a virtual network function manager (VNFM) to determine instantiation of a mobility management entity (MME) as a virtual network function (VNF); adding the MME VNF to an MME pool; and assigning a value to an application parameter of the MME VNF.

Example 27 may include the subject matter of Example 26, wherein the application parameter is a weight factor parameter and the value is a weight factor, wherein the weight factor is associated with selection of the MME VNF from a plurality of MMEs of the MME pool to service a user equipment (UE) connection.

Example 28 may include the subject matter of any one of Examples 26-27, wherein adding the MME VNF to the MME pool is in response to a notification that the MME VNF has been instantiated.

Example 29 may include the subject matter of Example 28, further comprising: determining a performance management (PM) measurement of a MME physical network function (PNF); sending the PM measurement to a network manager; and receiving the notification that the MME VNF has been instantiated in response to the send of the PM measurement.

Example 30 may include the subject matter of Example 29, wherein the PM measurement includes an MME processor usage measurement.

Example 31 may include the subject matter of Example 29, wherein the PM measurement includes an S1-MME data volume measurement.

Example 32 may include the subject matter of any one of Examples 27-31, wherein the weight factor is a first weight factor and the method further comprises assigning a second weight factor to an MME physical network function (PNF), wherein the second weight factor is lower than the first weight factor.

Example 33 may include the subject matter of Example 32, further comprising assigning an updated first weight factor to the MME VNF in response to a request to offload user equipments (UEs) from the MME VNF, wherein the updated first weight factor is lower than the first weight factor.

Example 34 may include the subject matter of any one of Examples 32-33, further comprising removing the MME VNF from the MME pool in response to a notification that all UEs are offloaded from the MME VNF.

Example 35 may include the subject matter of Example 34, further comprising sending a notification to a virtual network function manager (VNFM) that no UE is connected to the MME VNF.

Example 36 may include the subject matter of any one of Examples 27-31, wherein the weight factor is a first weight factor and the method further includes assigning a second weight factor to a second MME VNF in the MME pool, wherein the first weight factor is higher than the second weight factor.

Example 37 may include the subject matter of any one of Examples 27-36, wherein the MME pool is in a long term evolution (LTE) environment.

Example 38 may include a method comprising: processing a virtual network function (VNF) instantiation request from a network manager (NM); and directing a virtual network function manager (VNFM) to instantiate a mobility management entity (MME) VNF in response to the VNF instantiation request.

Example 39 may include the subject matter of Example 38, further comprising sending a resource allocation request to a virtualized infrastructure manager (VIM).

Example 40 may include the subject matter of Example 39, wherein the resource allocation request includes at least one of a compute allocation parameter or a storage allocation parameter.

Example 41 may include the subject matter of any one of Examples 38-40, further comprising sending an acknowledgement to the NM indicating MME VNF instantiation is completed.

Example 42 may include a method comprising: processing an instantiation request for a mobility management entity (MME) virtual network function (VNF) from a network function virtualization orchestrator (NFVO); sending a resource allocation request to the NFVO in response to the instantiation request; and configuring a MME VNF.

Example 43 may include the subject matter of Example 42, further comprising sending a notification to an element manager (EM) notifying the EM of the MME VNF.

Example 44 may include the subject matter of any one of Examples 42-43, further comprising sending an acknowledgement to the NFVO indicating completion of MME VNF instantiation.

Example 45 may include the subject matter of any one of Examples 42-44, further comprising processing a request from an EM to release capacity for the MME VNF and sending an offload request to the EM requesting the EM to offload user equipments (UEs) from the MME VNF.

Example 46 may include the subject matter of Example 45, further comprising performing a termination process to terminate the MME VNF in response to a notification from the EM that no UE is connected to the MME VNF.

Example 47 may include the subject matter of Example 46, further comprising sending an acknowledgement to the EM that an existing VNF has been updated as requested with a capacity release.

Example 48 may include a method comprising: processing performance management (PM) measurements for a mobility management entity (MME) from an element manager (EM); determining that the MME is overloaded in response to a PM measurement above a predefined threshold level; and sending a MME virtual network function (VNF) instantiation request to a network function virtualization orchestrator (NFVO).

Example 49 may include the subject matter of Example 48, wherein the PM measurement includes a MME processor usage measurement.

Example 50 may include the subject matter of Example 48, wherein the PM measurement includes a S1-MME data volume measurement.

Example 51 may include an apparatus for controlling mobility management entity (MME) load status comprising: means for processing a notification from a virtual network function manager (VNFM) to determine instantiation of a mobility management entity (MME) as a virtual network function (VNF); means for adding the MME VNF to an MME pool; and means for assigning a value to an application parameter of the MME VNF.

Example 52 may include the subject matter of Example 51, wherein the application parameter is a weight factor parameter and the value is a weight factor, wherein the weight factor is associated with selection of the MME VNF from a plurality of MMEs of the MME pool to service a user equipment (UE) connection.

Example 53 may include the subject matter of any one of Examples 51-52, wherein means for adding the MME VNF to the MME pool is to add the MME VNF to the MME pool in response to a notification that the MME VNF has been instantiated.

Example 54 may include the subject matter of Example 53, further comprising: means for determining a performance management (PM) measurement of a MME physical network function (PNF); means for sending the PM measurement to a network manager; and means for receiving the notification that the MME VNF has been instantiated in response to the send of the PM measurement.

Example 55 may include the subject matter of Example 54, wherein the PM measurement includes an MME processor usage measurement.

Example 56 may include the subject matter of Example 54, wherein the PM measurement includes an S1-MME data volume measurement.

Example 57 may include the subject matter of any one of Examples 52-56, wherein the weight factor is a first weight factor and the apparatus further comprises means for assigning a second weight factor to an MME physical network function (PNF), wherein the second weight factor is lower than the first weight factor.

Example 58 may include the subject matter of Example 57, further comprising means for assigning an updated first weight factor to the MME VNF in response to a request to offload user equipments (UEs) from the MME VNF, wherein the updated first weight factor is lower than the first weight factor.

Example 59 may include the subject matter of any one of Examples 57-58, further comprising means for removing the MME VNF from the MME pool in response to a notification that all UEs are offloaded from the MME VNF.

Example 60 may include the subject matter of Example 59, further comprising means for sending a notification to a virtual network function manager (VNFM) that no UE is connected to the MME VNF.

Example 61 may include the subject matter of any one of Examples 52-56, wherein the weight factor is a first weight factor and the apparatus further includes means for assigning a second weight factor to a second MME VNF in the MME pool, wherein the first weight factor is higher than the second weight factor.

Example 62 may include the subject matter of any one of Examples 52-61, wherein the MME pool is in a long term evolution (LTE) environment.

Example 63 may include an apparatus for controlling mobility management entity (MME) load status comprising: means for processing a virtual network function (VNF) instantiation request from a network manager (NM); and means for directing a virtual network function manager (VNFM) to instantiate a mobility management entity (MME) VNF in response to the VNF instantiation request.

Example 64 may include the subject matter of Example 63, further comprising means for sending a resource allocation request to a virtualized infrastructure manager (VIM).

Example 65 may include the subject matter of Example 64, wherein the resource allocation request includes at least one of a compute allocation parameter or a storage allocation parameter.

Example 66 may include the subject matter of any one of Examples 63-65, further comprising means for sending an acknowledgement to the NM indicating MME VNF instantiation is completed.

Example 67 may include an apparatus for controlling mobility management entity (MME) load status comprising: means for processing an instantiation request for a mobility management entity (MME) virtual network function (VNF) from a network function virtualization orchestrator (NFVO); mean for sending a resource allocation request to the NFVO in response to the instantiation request; and means for configuring a MME VNF.

Example 68 may include the subject matter of Example 67, further comprising means for sending a notification to an element manager (EM) notifying the EM of the MME VNF.

Example 69 may include the subject matter of any one of Examples 67-68, further comprising means for sending an acknowledgement to the NFVO indicating completion of MME VNF instantiation.

Example 70 may include the subject matter of any one of Examples 67-69, further comprising means for processing a request from an EM to release capacity for the MME VNF and means for sending an offload request to the EM requesting the EM to offload user equipments (UEs) from the MME VNF.

Example 71 may include the subject matter of Example 70, further comprising means for performing a termination process to terminate the MME VNF in response to a notification from the EM that no UE is connected to the MME VNF.

Example 72 may include the subject matter of Example 71, further comprising means for sending an acknowledgement to the EM that an existing VNF has been updated as requested with a capacity release.

Example 73 may include an apparatus for controlling mobility management entity (MME) load status comprising: means for processing performance management (PM) measurements for a mobility management entity (MME) from an element manager (EM); means for determining that the MME is overloaded in response to a PM measurement above a predefined threshold level; and means for sending a MME virtual network function (VNF) instantiation request to a network function virtualization orchestrator (NFVO).

Example 74 may include the subject matter of Example 73, wherein the PM measurement includes a MME processor usage measurement.

Example 75 may include the subject matter of Example 73, wherein the PM measurement includes a S1-MME data volume measurement.

Example 76 may include a hybrid management system comprising: a virtual network function manager (VNFM); and an element manager (EM) having: one or more storage media having instructions; and one or more processors, coupled with the one or more storage media to execute the instructions to: process a notification from the VNFM to determine instantiation of a mobility management entity (MME) as a virtual network function (VNF); add the MME VNF to an MME pool; and assign a value to an application parameter of the MME VNF.

Example 77 may include the subject matter of Example 76, wherein the application parameter is a weight factor parameter and the value is a weight factor, wherein the weight factor is associated with selection of the MME VNF from a plurality of MMEs of the MME pool to service a user equipment (UE) connection.

Example 78 may include the subject matter of any one of Examples 76-77, wherein the one or more processors are further to execute the instructions to add the MME VNF to the MME pool in response to a notification that the MME VNF has been instantiated.

Example 79 may include the subject matter of Example 78, wherein the one or more processors are further to execute the instructions to: determine a performance management (PM) measurement of a MME physical network function (PNF); send the PM measurement to a network manager; and receive the notification that the MME VNF has been instantiated in response to the send of the PM measurement.

Example 80 may include the subject matter of Example 79, wherein the PM measurement includes an MME processor usage measurement.

Example 81 may include the subject matter of Example 79, wherein the PM measurement includes an S1-MME data volume measurement.

Example 82 may include the subject matter of any one of Examples 77-81, wherein the weight factor is a first weight factor and the one or more processors are further to execute the instructions to assign a second weight factor to an MME physical network function (PNF), wherein the second weight factor is lower than the first weight factor.

Example 83 may include the subject matter of Example 82, wherein the one or more processors are further to execute the instructions to assign an updated first weight factor to the MME VNF in response to a request to offload user equipments (UEs) from the MME VNF, wherein the updated first weight factor is lower than the first weight factor.

Example 84 may include the subject matter of any one of Examples 82-83, wherein the one or more processors are further to execute the instructions to remove the MME VNF from the MME pool in response to a notification that all UEs are offloaded from the MME VNF.

Example 85 may include the subject matter of Example 84, wherein the one or more processors are further to execute the instructions to send a notification to a virtual network function manager (VNFM) that no UE is connected to the MME VNF.

Example 86 may include the subject matter of any one of Examples 77-81, wherein the weight factor is a first weight factor and the processing circuitry is also to assign a second weight factor to a second MME VNF in the MME pool, wherein the first weight factor is higher than the second weight factor.

Example 87 may include the subject matter of any one of Examples 77-86, wherein the MME pool is in a long term evolution (LTE) environment.

Example 88 may include an apparatus, method, or system comprising one or more of: a Network Manager (NM) to perform the network management function to manage one or more third generation partnership project (3GPP) networks directly or via an element manager (EM); a virtualized network function (VNF) Manager (VNFM) to perform lifecycle management of a VNF; wherein the EM is to perform an element management function related to management of virtualized network elements such as a mobility management entity (MME) VNF and non-virtualized network elements such as an MME physical network function (PNF) or a serving gateway (SGW); a network functions virtualization (NFV) orchestrator (NFVO) to perform orchestration of network resources and lifecycle management of network services; a virtualized infrastructure manager (VIM) to be responsible for the resource allocation and de-allocation; wherein the MME (VNF) is to perform a virtualized MME function; and wherein the MME (PNF) is to perform a non-virtualized MME function.

Example 89 may include the apparatus, method, or system of example 88 or some other example herein, wherein the NM is to receive one or more MME performance management (PM) measurements such as MME processor usage and/or S1-MME data volume from the EM, and detect that the MME (PNF) and/or MME (VNF) is overloaded based on monitoring of the PM measurements.

Example 90 may include the apparatus, method, or system of any of examples 88-89, or some other example herein, wherein the NM is to send a request to the NFVO to instantiate a new MME (VNF) to compensate the overloaded MME identified in Example 89.

Example 91 may include the apparatus, method, or system of any of examples 88-90, or some other example herein, wherein the NFVO is to call the VNFM to instantiate the MME (VNF).

Example 92 may include the apparatus, method, or system of any of examples 88-91, or some other example herein, wherein the VNFM is further to validate and process the instantiation request, and then request the NFVO to allocate the resources required by the MME VNF instance; the NFVO is to request the VIM to allocate the resources such as one or more of compute resources, storage resources, network resources, and/or some other type of resources; the VIM is to allocate the one or more resources and send an acknowledgement to the NFVO when the resource allocation is complete; and the NFVO is to forward the resource allocation acknowledgement to the VNFM.

Example 93 may include the apparatus, method, or system of any of examples 88-92, or some other example herein, wherein the VNFM is further to: transmit a request to the EM to configure the MME (VNF) with any VNF specific lifecycle parameters after the successful resources allocation by VIM; transmit a notification of the new MME (VNF) to the EM that will configure the MME (VNF) with application specific parameters; transmit an acknowledgement of the completion of VNF instantiation to the NFVO that forwards the acknowledgement of the completion of VNF instantiation to NM.

Example 94 may include the apparatus, method, or system of any of examples 88-93, or some other example herein, wherein the EM is further to add the MME (VNF) to the MME pool; configure a high weight factor such as relative MME capacity to the MME (VNF); and configure a low weight factor such as relative MME capacity to the MME (PNF) that is much lower than the weight factor of MME (VNF) to enable a user equipment (UE) to choose the MME (VNF) when one or more UEs are to re-attach to the network.

Example 95 may include the apparatus, method, or system of any of examples 88-94 or some other example herein, wherein the MME (PNF) is to offload one or more UEs to the MME (VNF) by first initiating a S1 release procedure with release cause "load balancing tracking area update (TAU) required" that will release one or more radio resource control (RRC) connections, and secondly after the RRC connections are released, an evolved NodeB (eNB) will request that the UE to initiate a TAU without providing the s-temporary mobile subscriber identity (S-TMSI) and/or the globally unique mobility management entity identifier (GUMMEI) to the eNB in RRC establishment; the UE is to initiate a TAU based on the RRC connection release with release cause "load re-balancing TAU required" to connect to the MME (VNF); and the MME (VNF) is to send the Update Location Request to a home subscriber server (HSS) to perform the location update.

Example 96 may include the apparatus, method, or system of example 88, or some other example herein, wherein the EM is to send a request to the VNFM to release the capacity for the MME (VNF), when the MME (VNF) is wasting capacity that is needed.

Example 97 may include the apparatus, method, or system of example 96 or some other example herein, wherein the VNFM requests a grant of VNF contraction from the NFVO.

Example 98 may include the apparatus, method, or system of any of examples 96-97 or some other example herein, wherein the NFVO is to determine to grant the VNFM to perform the VNF contraction, and send an acknowledgement to the VNFM.

Example 99 may include the apparatus, method, or system of any of examples 96-98 or some other example herein, wherein the VNFM is to request the EM to offload UEs from MME (VNF) to a neighboring MME.

Example 100 may include the apparatus, method, or system of any of examples 96-99, or some other example herein, wherein the EM is to configure the VNF application specific parameters by assigning assign a higher weight factor such as Relative MME Capacity, the MME (VNF) will offload UEs to the neighboring MME by first initiating the S1 release procedure with release cause "load balancing TAU required" that will release RRC connections, and secondly after the RRC connections are released, eNB will request the UE to initiate a TAU without providing neither the S-TMSI nor the GUMMEI to eNodeB in the RRC establishment, the UE initiates a TAU due to RRC connection release with release cause "load re-balancing TAU required" to connect to MME (VNF), the MME (VNF) notifies EM when all UE are offloaded to neighboring MME, the EM configures the VNF application specific parameters by removing the MME (VNF) from the MME pool, and the EM notifies VNFM that no UE is connected to MME (VNF).

Example 101 may include the apparatus, method, or system of any of examples 96-100 or some other example herein, wherein the VNFM is further to: terminate the MME (VNF) instance, request the VIM to release resources, report the successful VNF contraction to NFVO after the resources being successful released by VIM, and acknowledge to EM that an existing VNF has been updated as requested with capacity release.

Example 102 may include the apparatus, method, or system of any of examples 96-101 or some other example herein, wherein the EM and the VNFM are to update the MME (VNF) managed device.

Example 103 may include the apparatus, method, or system of example 88 or some other example herein, wherein the NFVO is to receive a request to instantiate a new VNF from the NM, and call the VNFM to instantiate the VNF.

Example 104 may include the apparatus, method, or system of example 103 or some other example herein, wherein the VNFM is to request the VIM to allocate the resources required by the VNF instance.

Example 105 may include the apparatus, method, or system of any of examples 103-104 or some other example herein, wherein the VNFM is further to configure the VNF with any VNF specific lifecycle parameters, the VNFM is further to notify the EM of the new VNF, the EM is further to configure the VNF with application specific parameters, and the VNFM is further to send an acknowledgement of the completion of the VNF instantiation to NFVO.

Example 106 may include the apparatus, method, or system of any of examples 103-105 or some other example herein, wherein the NFVO is to acknowledge the completion of the VNF instantiation to NM.

Example 107 may include the apparatus, method, or system of example 88 or some other example herein, wherein the EM is to send a request to release the capacity of the VNF to the VNFM, or the NM, via the EM, is to send a request to release the capacity of the VNF to the VNFM, or the VNFM is to decide to initiate VNF contraction.

Example 108 may include the apparatus, method, or system of example 107 or some other example herein, wherein the VNFM is to request the VNF to gracefully terminate a VNF component prior to VNF instance contraction.

Example 109 may include the apparatus, method, or system of any of examples 107-108 or some other example herein, wherein the VNFM requests the VIM to delete the VM(s), after the VNF component is gracefully terminated.

Example 110 may include the apparatus, method, or system of any of examples 107-109 or some other example herein, wherein the VNFM may notify the EM that an existing VNF has been updated with requested capacity reduction, after VIM acknowledging the successful resources release, and may notify EM or NM if the contraction is triggered by EM or NM.

Example 111 may include the apparatus, method, or system of any of examples 107-110 or some other example herein, wherein EM and VNFM updates the VNF managed device.

Example 112 may include an apparatus comprising means to perform one or more elements of a method described in or related to any of examples 88-111, or any other method or process described herein.

Example 113 may include one or more non-transitory computer-readable media comprising instructions to cause an electronic device, upon execution of the instructions by one or more processors of the electronic device, to perform one or more elements of a method described in or related to any of examples 88-111, or any other method or process described herein.

Example 114 may include an apparatus comprising control circuitry, transmit circuitry, and/or receive circuitry to perform one or more elements of a method described in or related to any of examples 88-111, or any other method or process described herein.

Example 115 may include a method of communicating in a wireless network as shown and described herein.

Example 116 may include a system for providing wireless communication as shown and described herein.

Example 117 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. A network function virtualization orchestrator (NFVO) comprising:
   one or more storage media having instructions; and
   one or more processors, coupled with the one or more storage media to execute the instructions to:
   process a virtual network function (VNF) instantiation request from a network manager (NM); and
   direct a virtual network function manager (VNFM) to instantiate a mobility management entity (MME) VNF in response to the VNF instantiation request.

2. The NFVO of claim 1, wherein the one or more processors are further to execute the instructions to send a resource allocation request to a virtualized infrastructure manager (VIM).

3. The NFVO of claim 2, wherein the resource allocation request includes at least one of a compute allocation parameter or a storage allocation parameter.

4. The NFVO of claim 1, wherein the one or more processors are further to execute the instructions to send an acknowledgement to the NM indicating MME VNF instantiation is completed.

5. An element manager (EM) comprising:
   receive circuitry to receive a notification from a virtual network function manager (VNFM); and
   control circuitry, coupled with the receive circuitry, to:
   process the notification to determine that a mobility management entity (MME) has been instantiated as a virtual network function (VNF); and
   add the MME to an MME pool.

6. The EM of claim 5, wherein the control circuitry is to configure the MME with one or more application specific parameters.

7. The EM of claim 5, wherein the MME pool is in a long term evolution (LTE) environment or a fifth generation (5G) environment.

8. At least one non-transitory computer-readable medium comprising instructions stored thereon that, in response to execution of the instructions by one or more processors cause an element manager to:
   process a request relating to a service level of a mobility management entity (MME) virtual network function (VNF); and
   remove the MME VNF from a MME VNF pool based at least in part on the request.

9. The at least one non-transitory computer-readable medium of claim 8, wherein the MME pool is in a long term evolution (LTE) environment or a fifth generation (5G) environment.

10. At least one non-transitory computer-readable medium comprising instructions stored thereon that, in response to execution of the instructions by one or more processors cause a virtual network function manager (VNFM) to:
    process an instantiation request for a mobility management entity (MME) virtual network function (VNF); and
    send a notification to an element manager (EM) notifying the EM of the MME VNF.

11. The at least one non-transitory computer-readable medium of claim 10, wherein the instantiation request is from a network function virtualization orchestrator (NFVO).

12. The at least one non-transitory computer-readable medium of claim 10, wherein the instructions are further to cause the VNFM to send an acknowledgement to a NFVO acknowledging completion of the MME VNF instantiation.

13. The at least one non-transitory computer-readable medium of claim 10, wherein the instructions are further to cause the VNFM to process a message relating to termination of the MME VNF; and terminate the MME VNF based at least in part on the message.

14. A virtual network function manager (VNFM) comprising:
    means for processing an instantiation request for a mobility management entity (MME) virtual network function (VNF); and
    means for sending a notification to an element manager (EM) notifying the EM of the MME VNF.

15. The VNFM of claim 14, wherein the instantiation request is from a network function virtualization orchestrator (NFVO).

16. The VNFM of claim 14, further including means for sending an acknowledgement to a NFVO acknowledging completion of MME VNF instantiation.

17. The VNFM of claim 14, further including means for processing a message relating to termination of the MME VNF, and means for terminating the MME VNF based at least in part on the message.

* * * * *